United States Patent
Reial

(10) Patent No.: US 7,372,895 B2
(45) Date of Patent: May 13, 2008

(54) METHOD OF AND SYSTEM FOR DELAY ESTIMATION WITH MINIMIZED FINGER ALLOCATION

(75) Inventor: Andres Reial, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 665 days.

(21) Appl. No.: 11/007,687

(22) Filed: Dec. 8, 2004

(65) Prior Publication Data

US 2006/0120440 A1    Jun. 8, 2006

(51) Int. Cl.
- *H04B 1/69* (2006.01)
- *H04B 1/707* (2006.01)
- *H04B 1/713* (2006.01)

(52) U.S. Cl. .................. 375/148; 375/150; 375/147; 375/142; 375/144; 370/320; 370/335; 370/342

(58) Field of Classification Search .............. 375/142, 375/143, 144, 145, 147, 148, 149, 150, 349; 370/320, 335, 342

See application file for complete search history.

(56) References Cited

U.S. PATENT DOCUMENTS

| | | | |
|---|---|---|---|
| 6,340,578 B1 | 1/2002 | Anderson, III et al. | |
| 6,377,613 B1 | 4/2002 | Kawabe et al. | |
| 6,560,273 B1 | 5/2003 | Sourour et al. | |
| 6,574,483 B1 | 6/2003 | Amerga | |
| 6,611,512 B1 | 8/2003 | Burns | |
| 6,680,967 B1 * | 1/2004 | Westman ................. | 375/148 |
| 6,711,420 B1 | 3/2004 | Amerga et al. | |
| 6,731,676 B2 | 5/2004 | Rick et al. | |
| 7,054,353 B2 * | 5/2006 | Ostman et al. .......... | 375/148 |
| 7,072,383 B2 * | 7/2006 | Saito et al. ............. | 375/148 |
| 7,079,569 B1 * | 7/2006 | Hayata ................... | 375/147 |
| 7,142,586 B2 * | 11/2006 | Reial ...................... | 375/148 |
| 7,197,063 B2 * | 3/2007 | Reial et al. ............. | 375/142 |
| 2001/0028677 A1 | 10/2001 | Wang et al. | |
| 2002/0094017 A1 | 7/2002 | Wang | |
| 2003/0103555 A1 | 6/2003 | Kyungtae et al. | |
| 2003/0171136 A1 | 9/2003 | Peng | |
| 2003/0215002 A1 | 11/2003 | Gorday et al. | |
| 2004/0052304 A1 | 3/2004 | Reial | |

(Continued)

FOREIGN PATENT DOCUMENTS

EP    0757450 A    2/1997

(Continued)

Primary Examiner—Phuong Phu
(74) Attorney, Agent, or Firm—Michael Cameron

(57) ABSTRACT

A signal-path delay-estimation method includes correlating a computed coarse delay profile of at least one detected signal path cluster with a waveform to yield a strongest correlated peak for each of the at least one detected signal path cluster. The method also includes, for each of the at least one detected signal path cluster, using the strongest correlated peak to determine an adjusted delay-profile phase, re-sampling the computed coarse delay profile in accordance with the adjusted delay-profile phase, and detecting signal-path-cluster edges using the re-sampled computed coarse delay profile. This Abstract is provided to comply with rules requiring an Abstract that allows a searcher or other reader to quickly acertain subject matter of the technical disclosure. This Abstract is submitted with the understanding that it will not be used to interpret or limit the scope or meaning of the claims. 37 CFR 1.72(b).

35 Claims, 2 Drawing Sheets

U.S. PATENT DOCUMENTS

| | | |
|---|---|---|
| 2004/0071193 A1 | 4/2004 | Atarashi et al. |
| 2004/0097204 A1 | 5/2004 | Jung et al. |
| 2004/0114674 A1 | 6/2004 | Lotter et al. |
| 2007/0041432 A1* | 2/2007 | Reial .................. 375/148 |

FOREIGN PATENT DOCUMENTS

| | | |
|---|---|---|
| EP | 1 028 540 A2 | 8/2000 |
| EP | 1 065 794 | 1/2001 |
| EP | 1 158 688 A1 | 11/2001 |
| EP | 1 303 058 A2 | 4/2003 |
| EP | 1 372 269 A1 | 12/2003 |
| EP | 1 376 887 A1 | 1/2004 |
| EP | 1 480 369 A | 11/2004 |
| WO | WO 0021201 A | 4/2000 |
| WO | WO 00/38468 | 6/2000 |
| WO | WO-02/29994 | 4/2002 |

* cited by examiner

METHOD OF AND SYSTEM FOR DELAY ESTIMATION WITH MINIMIZED FINGER ALLOCATION

CROSS-REFERENCE TO RELATED APPLICATIONS

This patent application incorporates by reference the entire disclosure of a patent application filed on the same date as this patent application entitled Method Of And System For Path Selection In Rich Multipath Conditions and bearing U.S. patent application Ser. No. 11/007685.

BACKGROUND OF THE INVENTION

1. Technical Field

The present invention relates generally to digital wireless communications systems in which delays of multi-path components of a time-varying fading channel are to be estimated, such as, for example, systems using RAKE receivers in Code Division Multiple Access (CDMA) systems. The invention is particularly suitable for, but is not limited to, receivers that operate in fading environments and have limited processing resources, such as those in Wideband CDMA (WCDMA) terminals.

2. History of Related Art

In wireless communications, a physical channel between a transmitter and a receiver is formed by a radio link. In most cases, a transmit antenna is not narrowly focused towards the receiver and, in addition to a possible direct path, many other propagation paths exist between the transmitter and the receiver. The propagation paths are often caused by reflections from surrounding objects. Rays with similar propagation distances combine at the receiver depending on an instantaneous phase relationship and form a distinct multi-path component. The effect of the combining depends on an instantaneous relationship of a carrier wavelength and distance differences and, in the case of destructive interference, the combining leads to a significant reduction in path-gain magnitude (i.e., fading).

Performance of a CDMA receiver is oftentimes improved if signal energy carried by many multi-path components is utilized via a RAKE receiver. In the RAKE receiver, a number of multi-path components are each assigned a despreader having a reference copy of a spreading code that is delayed equally to a path delay of a corresponding multi-path signal component. Outputs of the despreaders (i.e., RAKE fingers) are coherently combined to produce a symbol estimate.

The RAKE receiver requires knowledge of the multi-path delays and channel-impulse-response values for as many signal paths as possible. To achieve an optimal signal-to-noise ratio (SNR) at an output of a RAKE combiner, signal energy from as many physical paths as possible should be collected. In addition, tracking of as many different physical paths as possible (i.e., higher utilized diversity) tends to significantly increase reception robustness by reducing the probability of a simultaneous deep fade of all tracked signal paths. Simultaneous deep fading of all tracked signal paths is a phenomenon that leads to undesirable block error rate (BLER) degradation.

A propagation channel structure (i.e., absolute and relative delays of individual multi-path components) does not remain constant over time. Due to relative movement of the transmitter, the receiver, and nearby objects, existing path delays change, old paths disappear, and new paths appear. In addition, a frequency offset between the transmitter and receiver often gives rise to a slow clock drift, which may manifest itself as a gradual delay-profile time-axis movement. In order to ensure proper operation of the RAKE receiver, varying delays of all known multi-path components should be tracked, and new paths should be discovered quickly after they appear.

FIG. 1 is a block diagram of a typical RAKE receiver. A RAKE receiver 100 includes a delay estimator block 102, a channel estimator block 104, and a RAKE despreader/combiner block 106. Received data are fed to the delay estimator block 102. The delay estimator block 102 evaluates an impulse response of a channel over a range of possible delays of the channel. A resulting delay profile, which may be a complex delay profile or a power delay profile, may then be subjected to peak detection and detected peak locations reported to the RAKE despreader/combiner block 106 as delay estimates for the multi-path components. The delay estimates are also used by the channel estimator block 104 to estimate corresponding complex channel coefficients by despreading a pilot sequence and possibly filtering results over time to reduce the effects of noise and interference. Channel parameters are estimated in collaboration between the delay estimator block 102, which determines temporal alignment of a despreader portion of the RAKE despreader/combiner block 106, and the channel estimator block 104, which estimates the complex coefficients to be used by a combiner portion of the RAKE despreader/combiner block 106.

SUMMARY OF THE INVENTION

A signal-path delay-estimation method includes correlating a computed coarse delay profile of at least one detected signal path cluster with a waveform to yield a strongest correlated peak for each of the at least one detected signal path cluster. The method also includes, for each of the at least one detected signal path cluster, using the strongest correlated peak to determine an adjusted delay-profile phase, re-sampling the computed coarse delay profile in accordance with the adjusted delay-profile phase, and detecting signal-path-cluster edges using the re-sampled computed coarse delay profile.

An article of manufacture for signal-path delay estimation includes at least one computer readable medium and processor instructions contained on the at least one computer readable medium. The processor instructions are configured to be readable from the at least one computer readable medium by at least one processor and thereby cause the at least one processor to operate as to correlate a computed coarse delay profile of at least one detected signal path cluster with a waveform to yield a strongest correlated peak for each of the at least one detected signal path cluster and, for each of the at least one detected signal path cluster, use the strongest correlated peak to determine an adjusted delay-profile phase, re-sample the computed coarse delay profile in accordance with the adjusted delay-profile phase, and detect signal-path-cluster edges using the re-sampled computed coarse delay profile.

A signal-path delay-estimation system includes a delay estimator for correlating a computed delay profile of at least one detected signal path cluster with a waveform to yield a strongest correlated peak for each of the at least one detected signal path cluster. The delay estimator is also for, for each of the at least one detected signal path cluster, using the strongest correlated peak to determine an adjusted delay-profile phase, re-sampling the computed delay profile in accordance with the adjusted delay-profile phase, and detecting signal-path-cluster edges using the re-sampled computed delay profile. The system also includes a channel estimator inter-operably connected to an output of the delay estimator and a despreader/combiner inter-operably connected to an output of the channel estimator and the output of the delay estimator.

BRIEF DESCRIPTION OF THE DRAWINGS

A more complete understanding of the present invention may be obtained by reference to the following Detailed Description of Exemplary Embodiments of the Invention, when taken in conjunction with the accompanying Drawings, wherein.

DETAILED DESCRIPTION OF EXEMPLARY EMBODIMENTS OF THE INVENTION

Figure 1:
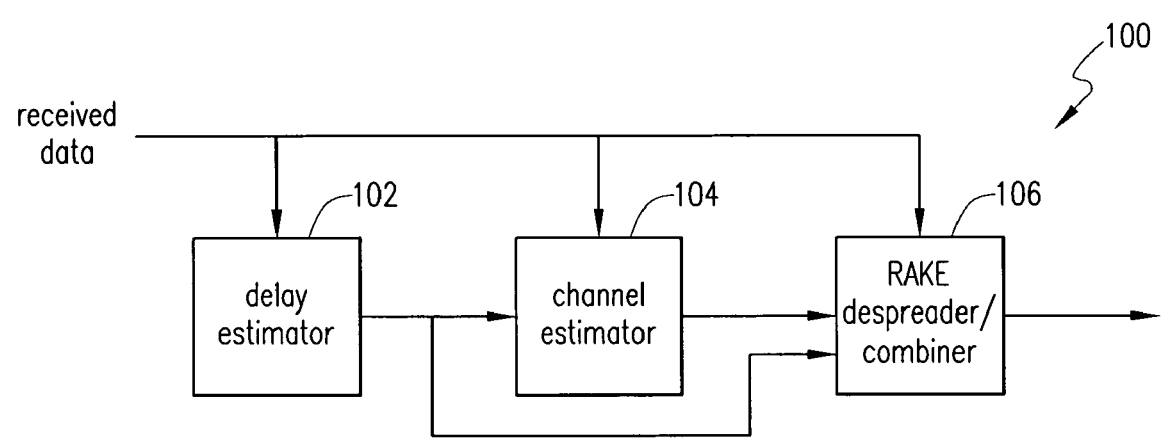
FIG. 1, previously described, is a block diagram of a typical RAKE receiver.

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Two approaches to delay estimation (DE) are as follows: 1) peak-detection-oriented DE; and 2) fixed-grid DE. In peak-detection-oriented DE, a precise position (i.e., a delay) of a particular multi-path component is estimated in order to tune a respective despreader precisely to the estimated delay. In principle, peak-detection-oriented DE involves evaluating a channel impulse response over an entire range of possible delays (i.e., delay spread) of the channel in question. A resulting complex delay profile (CDP) or power delay profile (PDP) may then be subjected to peak detection. The peak locations ($d_i$) are reported to the RAKE receiver as delay estimates.

Processing and power-consumption expenses of frequently executing a full path-searching routine in accordance with peak-detection-oriented DE are usually prohibitive.

Therefore, typical implementations may use path searchers (PS) with observation windows shorter than a full search area (i.e., maximal assumed delay spread) and reduced PS resolution (e.g., 1 chip). Additional densely-sampled windows of despreaders may be used that produce higher-resolution (e.g., ¼ chip) estimates of certain areas of the PDP for precise reporting of delays.

Fixed-grid DE is based on the principle that, in order to capture all available signal energy, it is not necessary to place RAKE fingers exactly on path positions. It is instead sufficient to lay a grid of fingers with a certain minimal spacing, equal to the Nyquist sampling rate of the received signal, over a delay-domain area where a dominant portion of the signal energy lies.

In fixed-grid DE, the grid is fixed in the sense that the only delay values allowed are kT, where T is the grid spacing (e.g., $T=\frac{3}{4}T_c$, where $T_c$ is the chip period) and k is an integer value. Thus, in fixed-grid DE, it is necessary only to determine the edges of a PDP active region (i.e., $\tau_{left}$ and $\tau_{right}$) and turn on the grid positions (i.e., $\tau_{left} \leq kT \leq \tau_{right}$). In fixed-grid DE, no attempt is made to isolate the precise location of individual paths. In some cases, if the active PDP includes several clusters, the grid is placed in several positions. So-called empty regions of the PDP are not covered.

While fixed-grid DE does not attempt to estimate the precise delays of the individual components, the delay list at its output provides similar information to that provided by peak-detection-oriented DE. The delay list provided by either fixed-grid DE or peak-detection-oriented DE is used identically by subsequent RAKE-receiver blocks.

Peak-detection-oriented DE provides an economical despreading arrangement if, for example, the channel consists of a single well-defined path. A location of the single path may then be detected relatively easily and precisely and a single RAKE finger may extract all available energy. In similar fashion, if the channel consists of several separated well-defined paths and the peak detection may be applied to each of them, peak-detection-oriented DE is quite economical.

On the other hand, if the channel consists of a closely-spaced cluster of paths, it may be difficult to identify individual path positions, since signal energy from the different paths typically overlaps due to side lobes of transmit/receive ("tx/rx") filters. Furthermore, while the physical-path delays may remain constant, multi-path fading and a constantly-changing complex combining pattern of neighboring paths often causes a constant fluctuation of the observed PDP; therefore, tracking of the apparently-changing, but actually physically-fixed, delay positions can be quite challenging. Resulting difficulties for a DE process oftentimes create a need for heuristic mechanisms to avoid various pathological behaviors. However, the heuristic mechanisms can serve to tune the DE process to special cases and reduce the general applicability of the process. If an attempt is made to catch a path with a single finger, and the finger is misplaced even by ¼ chip or ½ chip, a significant portion of the path energy is lost, and the interference is increased.

Fixed-grid DE, in contrast, provides a much more robust way to capture the signal energy, since no assumptions are made about the precise path locations of the paths, inter-path distances, or fading behavior. As long as the true delay $d_i$ satisfies $\tau_{left} < d_i < \tau_{right}$, the detected signal energy is optimally utilized. However, since it is not certain that $d_i = kT$ for some k, but rather $kT < d_i < (k+1)T$, several, and typically two, fingers must be placed to capture full path energy from a single path.

As a general principle, in fixed-grid DE, to capture energy from a cluster of width mT (or from m Nyquist-spaced neighboring paths), m+1 fingers are needed. The number of necessary m+1 fingers is always greater than for peak-detection-oriented DE, and may be as much as twice the number of fingers used in peak-detection-oriented DE if the delay profile contains only stand-alone paths. For an extended path cluster, the extra expenditure of fingers is negligible.

In various embodiments of the invention, a DE approach is used that allows non-peak-specific finger positions for multi-peak clusters, while avoiding mis-sampling and wasted fingers under single-path circumstances. A DE process applies fixed-grid finger placement to each PDP path cluster, while a grid offset is adjusted individually for each cluster, thereby allowing sampling-phase optimization for single-peak objects in the PDP, avoiding placement of unnecessary fingers, and maintaining robust coverage of extended clusters. A mechanism detects the proper sampling phase for a given cluster by correlating the PDP of the cluster with a single-path PDP or other waveform at various sampling offsets; if a peak is found in the filtering result, the fixed grid phase for the given cluster is adjusted without affecting the phase of the other clusters. Various embodiments of the invention allow handling of single-path-dominated clusters efficiently as single paths without requiring a heuristic decision operation on each signal cluster.

Figure 2:
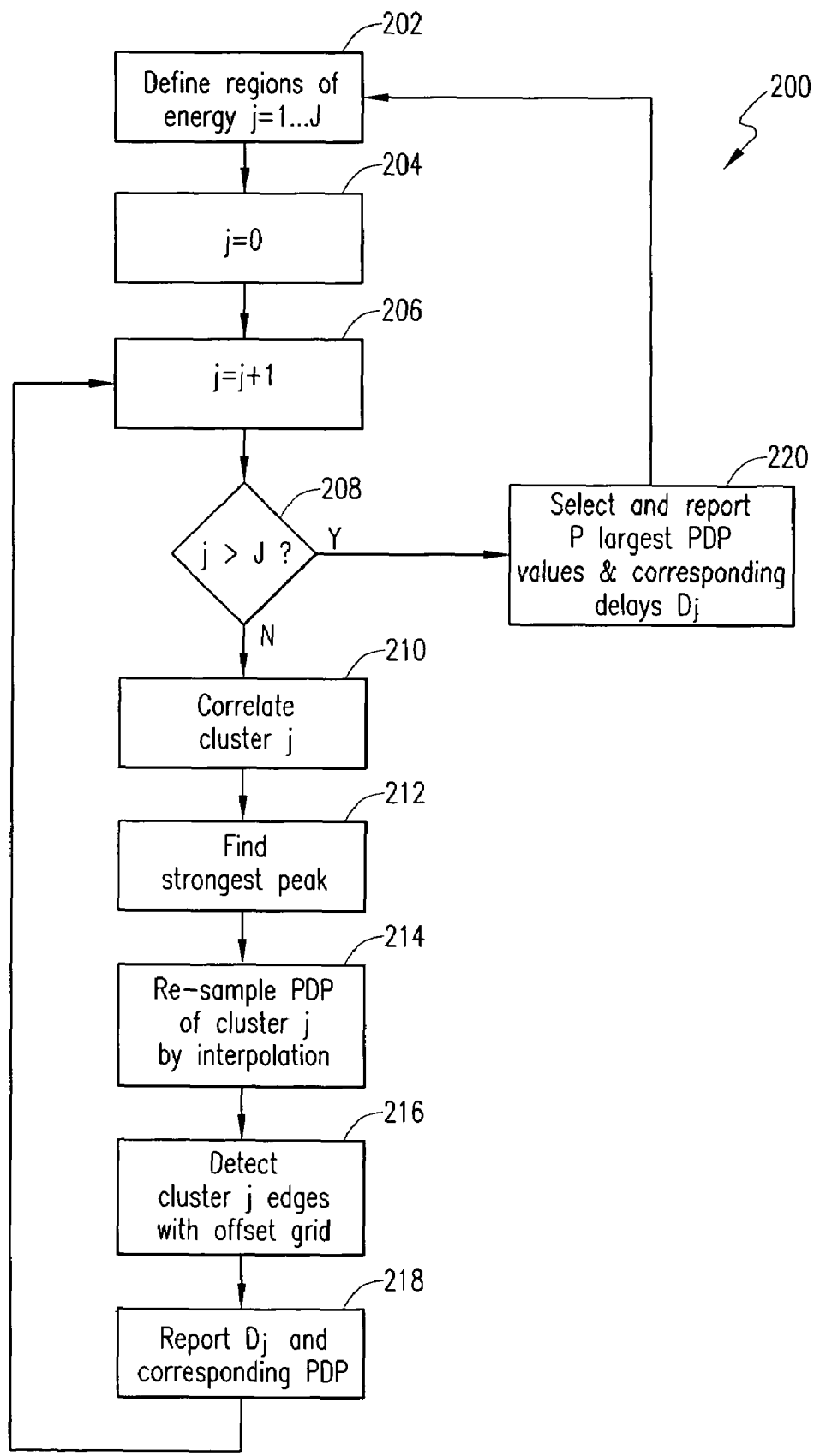
FIG. 2 is a flow chart that illustrates a delay-estimation process.

FIG. 2 is a flow chart that illustrates a delay-estimation process 200. In connection with the process 200, an input data sampling period is denoted $T_s$ (e.g., $T_s=T_c/4$, where $T_c$ is a CDMA chip period). A PDP with values $g_k$ is calculated at a resolution T (e.g., $T=3T_c/4$), which is typically a lesser resolution than the input sampling period $T_s$ in order to conserve computation resources. The DE process 200 may report as many as P paths.

The DE process 200 begins at step 202. At step 202, regions of energy (i.e., signal path clusters) j in the PDP are defined by detecting a left and a right boundary for each: $\{\tau_{left}^{(j)}, \tau_{right}^{(j)}\}$, j=1 . . . j. The boundary detection performed at step 202 may be implemented as for example, a thresholding operation requiring that a signal-path cluster element be greater than a pre-defined value, such as, for example, two times stronger than a PDP noise floor.

From step 202, execution proceeds to step 204. At step 204, a counter j is started at an initial value of zero. At step 206, the counter j is incremented. At step 208, a determination is made whether the counter j has exceeded the pre-defined value J, J being the number of previously-detected signal clusters from step 202. If, at step 208, it is not determined that the counter has exceeded J, execution proceeds to step 210.

From step 208, if it is determined that the counter has not exceeded J, steps 210-218 are performed for j=1 . . . J (i.e., for each signal path cluster). Although steps 210-218 are illustrated in FIG. 2 as being performed sequentially, those having ordinary skill in the art will appreciate that steps 210-218 may also be performed in parallel without departing from principles of the invention. In particular, at step 210, the signal path cluster under consideration (i.e., signal path cluster j) is correlated with a waveform $h_{kj}^{(t)}$ suitable for deducing the path structure of the cluster (i.e., a different waveform for each grid phase t within the $T_s$ scale). The waveform may be, for example, a single-path PDP waveform or the response of a filter implementing the inverse of a single-path pulse shaping operation. At step 212, the grid phase $t_j$ that produces the strongest correlation peak in the signal path cluster j is found. In other words, for t=0 . . . L−1, a correlation product $C_t^{(j)}$ is calculated as follows:

$$c_t^{(j)} = \sum_{l=\tau_{left}^{(j)}}^{\tau_{right}^{(j)}} g_l h_l^{(t+\tau_{left}^{(j)})}.$$

The grid phase $t_j$ is determined as $$t_j = \left(\operatorname{argmax}_t c_t^{(j)}\right) \bmod \frac{T}{T_s}, \quad L = \frac{T}{T_s}(\tau_{right}^{(j)} - \tau_{left}^{(j)}), \text{ and } h_l^{(t)} = h_{l-t}.$$

From step 212, execution proceeds to step 214. At step 214, the PDP of cluster j is re-sampled, via interpolation, to produce $$g_{k+t_j \frac{T}{T_s}}$$

in the interval $\{\tau_{left}^{(j)}, \tau_{right}^{(j)}\}$. Those having ordinary skill in the art will recognize that various different interpolation schemes may be used without departing from principles of the invention. From step 214, execution proceeds to step 216. At step 216, the edges $\tau_{left}^{(j)*}=\tau_{right}^{(j)*}$ of the current cluster (i.e., cluster j) are detected with an offset grid determined via the interpolation of step 214. If the cluster j is a single-path object, the new boundaries are $\tau_{left}^{(j)*}=\tau_{right}^{(j)*}$. From step 216, execution proceeds to step 218. At step 218, a position list $D_j=[\tau_{left}^{(j)*}, \tau_{right}^{(j)*}]$ and a corresponding PDP value list $G_j=g_{k'}$, k' and $\tau_{left}^{(j)*} \ldots \tau_{right}^{(j)*}$ are reported for the cluster j. From step 218, execution returns to step 206.

If, at step 208, it is determined that j>J, execution proceeds to step 220. At step 220, the P largest values over all $G_j$, j=1 . . . J are selected and corresponding delays from $D_j$ are reported as the delay estimates and output from the delay estimator. From step 220, execution returns to step 202.

The PDP generation may be performed for the original fixed grid positions kT at all times in order to simplify, for example, a hardware implementation, as the re-sampling provides the necessary shift per cluster. The correlation may be done rarely, for example, every N-th DE update cycles, where N is chosen so as to limit path movement/drift during the $NT_{DE}$ slots to a distance less than $T_s$, where $T_{DE}$ is the time corresponding to a DE update cycle.

In some embodiments of the invention, the grid phase correction is helpful if a clear correlation peak exists (i.e., a single defined peak exists in the cluster), while in the absence of a clear peak near the edge of the cluster, the correction does not necessarily noticeably improve the finger-allocation economy. Therefore, in some embodiments, processing resources may be saved by an implementation that performs the re-sampling and edge re-detection only if a correlation peak is found at a cluster edge. Furthermore, in some embodiments of the invention, a procedure targeting only single-path objects in the PDP for re-sampling may skip all processing for clusters wider than the single-path PDP waveform.

A CDP may be used instead of a PDP, in which case the power of each delay profile element is found by multiplying the complex coefficient by its complex conjugate. Edge detection criteria and threshold values other than those described above may be used without departing from principles of the invention. The PDP may be computed for the adjusted delay positions; if so, no PDP re-sampling is needed in many cases. Correlation peak detection periods may be equal to or different from the DE update period. Different criteria for processing individual PDP clusters may be used.

Various embodiments of the present invention may be implemented in, for example, hardware, software (e.g., carried out by a processor that executes computer-readable instructions), or a combination thereof. The computer-readable instructions may be program code loaded in a memory such as, for example, Random Access Memory (RAM), or from a storage medium such as, for example, Read Only Memory (ROM). For example, a processor may be operative to execute software adapted to perform a series of steps in accordance with principles of the present invention. The software may be adapted to reside upon a computer-readable medium such as, for example, a magnetic disc within a disc drive unit. The computer-readable medium may also include a flash memory card, EEROM based memory, bubble memory storage, ROM storage, etc. The software adapted to perform steps according to principles of the present invention may also reside, in whole or in part, in static or dynamic main memories or in firmware within a processor (e.g., within microcontroller, microprocessor, or a microcomputer internal memory).

It should be emphasized that the terms "comprise/comprises/comprising" when used in this specification are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

What is claimed is:

1. A signal-path delay-estimation method comprising:
    correlating a computed coarse delay profile of at least one detected signal path cluster with a waveform to yield a strongest correlated peak for each of the at least one detected signal path cluster; and
    for each of the at least one detected signal path cluster:
        a) using the strongest correlated peak to determine an adjusted delay-profile phase;
        b) re-sampling the computed coarse delay profile in accordance with the adjusted delay-profile phase; and
        c) detecting signal-path-cluster edges using the re-sampled computed coarse delay profile.

2. The method of claim 1, further comprising:
    computing the coarse delay profile; and
    detecting edges of the at least one signal path cluster of the computed coarse delay profile.

3. The method of claim 2, wherein the step of detecting the edges of the at least one signal comprises a thresholding operation.

4. The method of claim 3, wherein the thresholding operation comprises requiring that the at least one signal path cluster be greater than a pre-defined value times a delay-profile noise floor.

5. The method of claim 1, further comprising, for each of the at least one detected signal path cluster, reporting the detected signal-path-cluster edges and delay-profile values of the re-sampled computed coarse delay profile.

6. The method of claim 1, wherein at least two of the at least one detected signal path cluster have the same adjusted delay-profile phase.

7. The method of claim 1, wherein:
    the step of correlating is performed every N delay-estimation cycles; and
    N is chosen so as to limit signal-path drift during N delay-estimation cycles to less than an input data sampling period $T_s$.

8. The method of claim 2, wherein, for each of the at least one detected signal path cluster, steps a), b), and c) are performed only if the strongest correlated peak is within a pre-defined time from a detected edge of the signal path cluster.

9. The method of claim 1, wherein, for each of the at least one detected signal path cluster, steps a), b), and c) are performed only if the strongest correlated peak is the single defined peak within the signal path cluster.

10. The method of claim 9, wherein the single defined peak is a peak that is a pre-defined amount greater than any other correlated peak.

11. The method of claim 1, wherein the coarse delay profile is selected from the group consisting of a coarse complex delay profile and a coarse power delay profile.

12. The method of claim 1, wherein a power-delay-profile correlation period is identical to a delay-estimation update period.

13. The method of claim 3, wherein an identical threshold is used for each detected signal-path cluster.

14. The method of claim 1, wherein the waveform is a single-path waveform.

15. The method of claim 1, wherein the waveform is the inverse of a single-path pulse shape function.

16. The method of claim 1, wherein the step of re-sampling the computed coarse delay profile is performed via interpolation.

17. An article of manufacture for signal-path delay estimation, the article of manufacture comprising:
    at least one computer readable medium;
    processor instructions contained on the at least one computer readable medium, the processor instructions configured to be readable from the at least one computer readable medium by at least one processor and thereby cause the at least one processor to operate as to:
        correlate a computed coarse delay profile of at least one detected signal path cluster with a waveform to yield a strongest correlated peak for each of the at least one detected signal path cluster; and
        for each of the at least one detected signal path cluster:
            use the strongest correlated peak to determine an adjusted delay-profile phase;
            re-sample the computed coarse delay profile in accordance with the adjusted delay-profile phase; and
            detect signal-path-cluster edges using the re-sampled computed coarse delay profile.

18. The article of manufacture of claim 17, wherein the computed coarse power delay profile is re-sampled via interpolation.

19. The article of manufacture of claim 17, wherein the coarse delay profile is selected from the group consisting of a coarse complex delay profile and a coarse power delay profile.

20. A signal-path delay-estimation system comprising:
    a delay estimator for:
        correlating a computed delay profile of at least one detected signal path cluster with a waveform to yield a strongest correlated peak for each of the at least one detected signal path cluster; and
        for each of the at least one detected signal path cluster:
            a) using the strongest correlated peak to determine an adjusted delay-profile phase;
            b) re-sampling the computed delay profile in accordance with the adjusted delay-profile phase; and
            c) detecting signal-path-cluster edges using the re-sampled computed delay profile;
    a channel estimator inter-operably connected to an output of the delay estimator; and
    a despreader/combiner inter-operably connected to an output of the channel estimator and the output of the delay estimator.

21. The system of claim 20, wherein the delay estimator is for:
  computing the delay profile; and
  detecting edges of the at least one signal path cluster of the computed delay profile.

22. The system of claim 21, wherein the detection of the edges of the at least one signal comprises a thresholding operation.

23. The system of claim 22, wherein the thresholding operation comprises requiring that the at least one signal path cluster be greater than a pre-defined value times a delay-profile noise floor.

24. The system of claim 20, wherein the delay estimator is for, for each of the at least one detected signal path cluster, reporting the detected signal-path-cluster edges and delay-profile values of the re-sampled computed delay profile.

25. The system of claim 20, wherein at least two of the at least one detected signal path cluster have the same adjusted delay-profile phase.

26. The system of claim 20, wherein:
  the correlation is performed every N delay-estimation cycles; and
  N is chosen so as to limit signal-path drift during N delay-estimation cycles to less than an input data sampling period $T_s$.

27. The system of claim 21, wherein, for each of the at least one detected signal path cluster, the delay estimator performs a), b), and c) only if the strongest correlated peak is within a pre-defined time from a detected edge of the signal path cluster.

28. The system of claim 20, wherein, for each of the at least one detected signal path cluster, the delay estimator performs a), b), and c) only if the strongest correlated peak is the single defined peak within the signal path cluster.

29. The system of claim 28, wherein the single defined peak is a peak that is a pre-defined amount greater than any other correlated peak.

30. The system of claim 20, wherein the delay profile is selected from the group consisting of a complex delay profile and a power delay profile.

31. The system of claim 20, wherein a delay-profile correlation period is identical to a delay-estimation update period.

32. The system of claim 22, wherein an identical threshold is used for each detected signal-path cluster.

33. The system of claim 20, wherein the re-sampling of the computed delay profile is performed via interpolation.

34. The system of claim 20, wherein the waveform is a single-path waveform.

35. The system of claim 20, wherein the waveform is the inverse of a single-path pulse shape function.

* * * * *

UNITED STATES PATENT AND TRADEMARK OFFICE
CERTIFICATE OF CORRECTION

PATENT NO.       : 7,372,895 B2
APPLICATION NO.  : 11/007687
DATED            : May 13, 2008
INVENTOR(S)      : Reial Page 1 of 1

It is certified that error appears in the above-identified patent and that said Letters Patent is hereby corrected as shown below:

In Fig. 1, Sheet 1 of 2, below "FIG. 1" insert -- PRIOR ART --.

In Column 5, Lines 61-62, delete " $t_j = \left(\operatorname{argmax}_t c_t^{(j)}\right) \bmod \frac{T}{T_s},$ " and insert -- $t_j = \left(\arg\max_t c_t^{(j)}\right) \bmod \frac{T}{T_s},$ --, therefor.

Signed and Sealed this

Sixteenth Day of March, 2010

David J. Kappos
*Director of the United States Patent and Trademark Office*